Jan. 9, 1940.　　　D. K. PILKINGTON　　　2,186,808
POWER TRANSMISSION DEVICE
Filed April 17, 1936　　　2 Sheets-Sheet 1
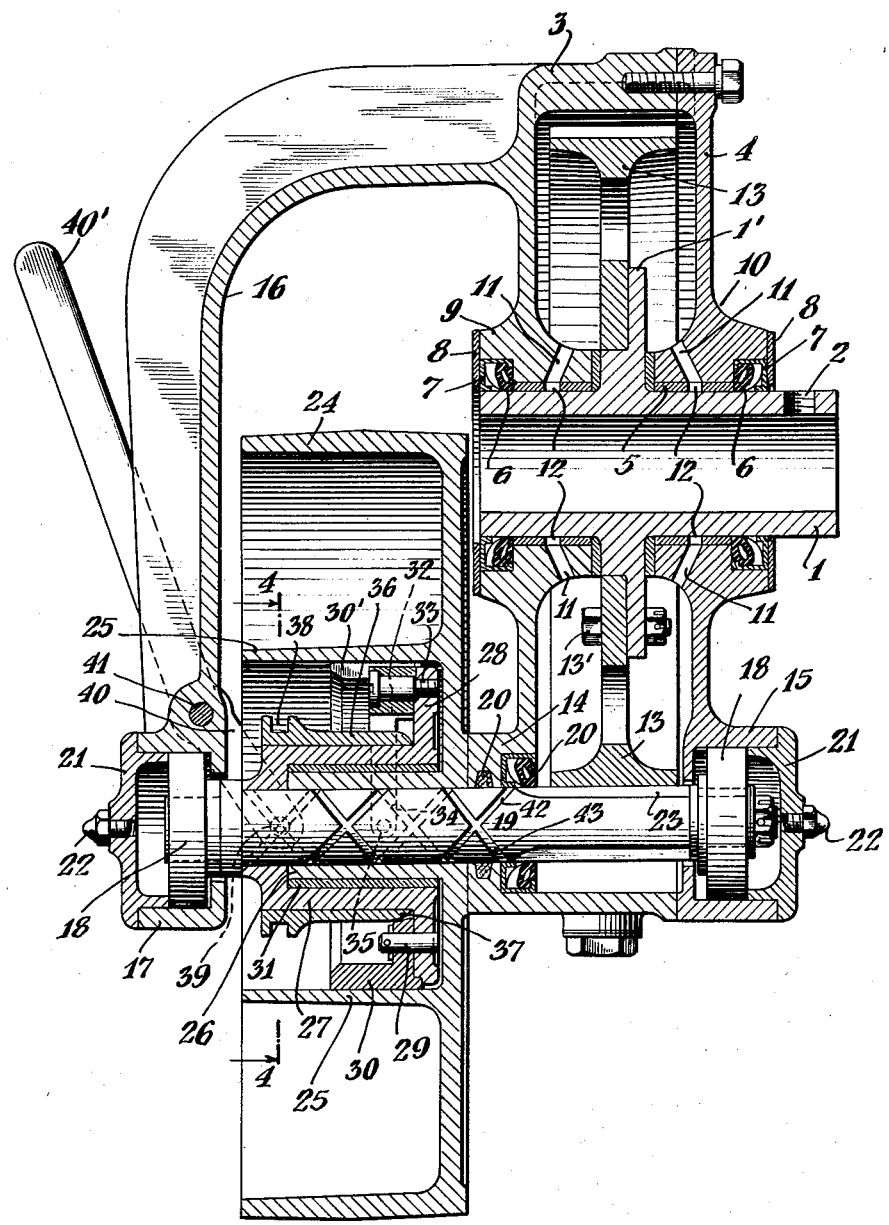
INVENTOR
David K. Pilkington
BY
Austin & Dix
ATTORNEYS Jan. 9, 1940. D. K. PILKINGTON 2,186,808
POWER TRANSMISSION DEVICE
Filed April 17, 1936    2 Sheets-Sheet 2
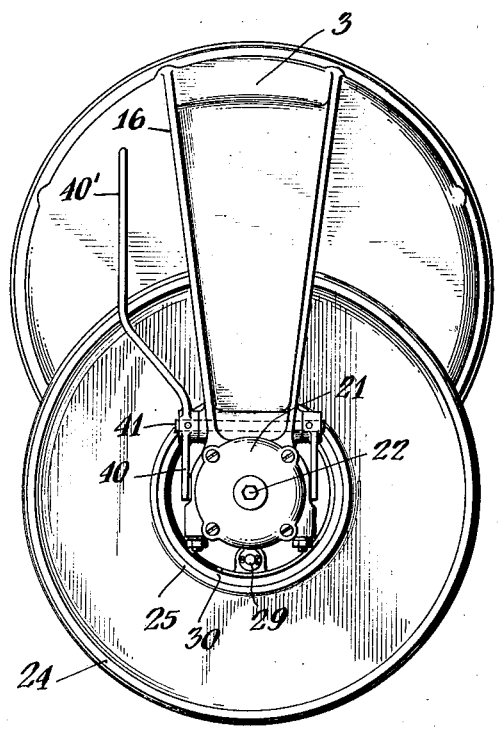
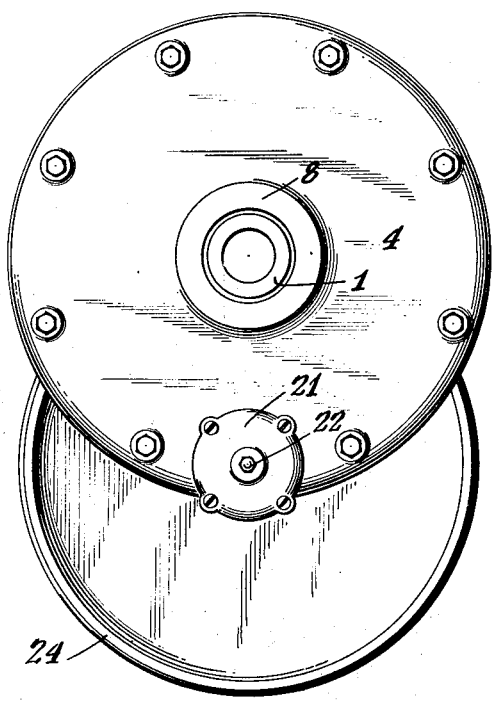
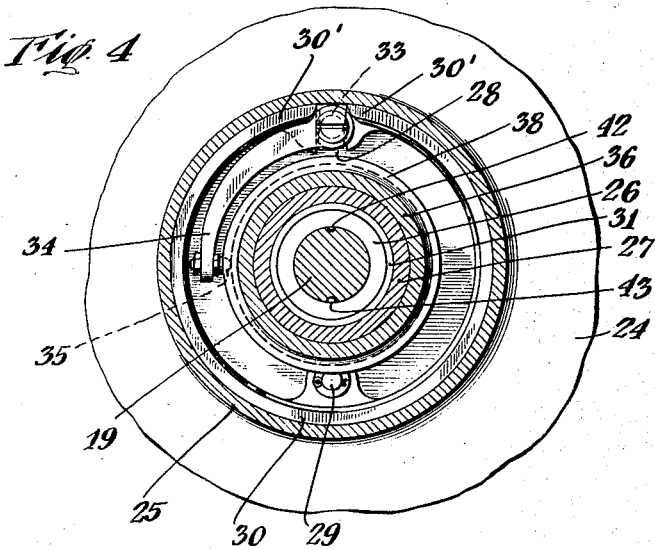
INVENTOR
David K. Pilkington
BY
Austin & Dix
ATTORNEYS Patented Jan. 9, 1940

2,186,808

UNITED STATES PATENT OFFICE 2,186,808

POWER TRANSMISSION DEVICE

David K. Pilkington, Sunbury-on-Thames, England, assignor, by mesne assignments, to Richard Lewis Woodhouse, Melbourne, Victoria, Australia Application April 17, 1936, Serial No. 74,857
In Great Britain June 7, 1935

4 Claims. (Cl. 74—242.9)

This invention relates to power transmission devices of the kind in which power is transmitted by means of a belt pulley having a geared connection with the shaft to be driven, the belt pulley being supported by a floating carrier which can swing about the axis of the driven shaft to tighten automatically the belt passing over the pulley.

The present invention is characterized by the combination with a floating or swinging carrier in the form of a closed housing serving as a lubricant container, of a pulley shaft having channels or grooves, such as right or left hand helixes, for the circulation of lubricant from the container, thereby insuring automatic lubrication and consequent reduction of friction and wear. The invention also embodies a sleeve for mounting the device on a shaft, which sleeve is provided with an integral flange and constitutes a hub for one of the gears. A clutch may be interposed between the pulley and its shaft, and the pulley provided with an annular flange surrounding the hub, to serve as one of the clutch surfaces, the hub being supplied with lubricant from the channels, so that when declutched and driven freely about its shaft, it is effectively lubricated.

Various other features and advantages of the invention will be apparent from the following particular description and from an inspection of the accompanying drawings.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which:

Fig. 1 is a view showing a longitudinal section through one form of the device;

Fig. 2 is a front elevational view of the device;

Fig. 3 is a rear elevational view, and

Fig. 4 is a view showing a cross section taken along line 4—4 of Fig. 1, illustrating the clutch mechanism.

In the following description and in the claims, various details will be identified by specific names for convenience, but they are intended to be as generic in their application as the art will permit. Like reference characters denote like parts in the several figures of the drawings.

In the description of the invention and in the drawings accompanying and forming part of this specification, certain specific disclosure of the invention is made for purposes of explanation, but it will be understood that the details may be modified in various respects without departure from the broad aspect of the invention.

In the example illustrated, there is provided a sleeve 1 to receive the shaft (not shown) of the machine (not shown) to be driven, which shaft may be fixed in the sleeve 1 by a set screw, screwed into the hole 2. A housing 3 is freely mounted on the sleeve 1, so that it can swing about the axis of said sleeve and the housing 3 is closed by a removable end plate 4 and so forms a sealed container for lubricant. A gunmetal bearing bushing 5 is interposed between the sleeve 1 and adjacent portions of the housing 3 and end plate 4. Packing rings 6 with their cages 7 are disposed in the housing 3 and plate 4 and retaining rings 8 are secured to the hubs 9 and 10 of the housing 3 and end plate 4, respectively. Inclined lubricant channels 11 are formed in the hubs 9 and 10 to lead lubricant from the housing 3 to the sleeve 1 through openings 12 in the bushing 5.

The sleeve 1 has an integral flange 1' serving as a hub for a gear wheel 13 fixed thereto as by bolts 13' for rotation within the housing 3.

The housing 3 and the end plate 4 are provided with recessed bosses 14 and 15 on their lower sides and the housing 3 has an arm or extension 16, which is also provided with a recessed boss 17 on its lower side. Ball or roller bearings 18 are fitted in the bosses 15 and 17, for a pulley shaft 19 and the recessed boss 14 carries packing rings 20 for the shaft 19. End caps 21, fitted with lubricating caps or nipples 22, close the bosses 15 and 17.

The pulley shaft 19 is provided with gear teeth 23, constituting a toothed pinion, which meshes with the gear wheel 13 within the housing 3. A pulley 24 is freely mounted on the shaft 19 and has an annular flange 25 situated between the hub 25 and the driving rim, and an expanding band clutch is disposed between the pulley hub 26 and the annular flange 25. The clutch comprises a hub 27 formed with an end plate or flange 28 carrying a pivot pin 29 for an expanding band 30, which frictionally engages the annular flange 25 when said band 30 is expanded. The clutch hub 27 is fixed on the pulley shaft 19 in a suitable manner to rotate therewith, and the pulley hub 26 is freely rotatable in the clutch hub 27, when the band 30 is disengaged from the annular flange 25. A gun-metal bearing bushing 31 is interposed between the hubs 26 and 27.

An elongated block or cam 32 is pivotally mounted on a pin 33 between the facing ends of the band 30, one end of said band being shown at 30'.

The block or cam 32 is provided with a laterally curved lever 34 depending therefrom, the lever 34 being fitted at its free end with a hardened pin 35, which lies in the path of a sleeve 36, mounted to slide backwards and forwards on the clutch hub 27. The sleeve 36 has a conical forward end 37 and an annular groove 38 at the other end to receive freely pins 39 on the forked end 40 of an operating lever 40', which is pivotally mounted at 41 on the extension 16 of the housing 3. When the sleeve 36 is slid inwards by the operating lever, it engages the pin 35, and forces the curved lever 34 outwards laterally, so turning the block or cam 32, which forces the ends of the band 30 apart and so expands said band. The band so expanded grips the annular flange 25 and clutches the pulley 24 to the shaft 19.

If desired, the clutch may be so designed that it will slip when a predetermined maximum torque is applied thereto. Thus if a predetermined overload is developed, the clutch will slip and prevent breaking of the belt or other portions of the mechanism.

The pulley 24 is driven by a belt from a driving unit such as a motor. Thus, when the pulley is declutched from its shaft 19, it is driven freely about said shaft. In order to avoid friction and wear under these conditions, it is essential to provide for effective lubrication. Intermittent lubrication by an attendant is unsatisfactory, as there is always the possibility of inadvertent omission and hence it is preferable to provide for continuous automatic lubrication.

In order to provide for automatic lubrication, the pulley shaft 19 is provided with left and right-handed helical grooves or channels 42, 43, which insure circulation of lubricant from the housing 3 which forms a lubricant container. The shaft 19 and pulley hub 26 are thus effectively lubricated automatically, by lubricant from the housing 3 flowing through the channels or grooves 42, 43.

In operation, when power is transmitted by a belt (not shown) from the driving unit, such as an electric motor (not shown) to the belt pulley 24, the pinion 23 first makes an epicyclic movement about the gear wheels 13, thereby swinging the housing 3 about the sleeve 1, which is attached to the shaft to be driven. This swinging movement tightens the belt, whereupon the drive is transmitted by the pinion 23 to the gear wheel 13 in the normal manner. As the load increases, the belt is tightened automatically to correspond to the load.

From the foregoing, it will be seen that the device is one which can be readily manufactured and assembled and is capable of being easily disassembled for adjustment or repair. The flanged sleeve provides a rugged and effective and easily assembled hub and mounting arrangement for the gear 13. The housing members 3, 4 and grooved pulley shaft provide means for continuously supplying lubrication automatically to the wearing parts of the device.

While certain novel features of the invention have been disclosed and are pointed out in the annexed claims, it will be understood that various omissions, substitutions and changes may be made by those skilled in the art without departing from the spirit of the invention.

What I claim is:

1. In a power transmission device, a rotatable support, a spur gear mounted on said support, a carrier mounted on said rotatable support, to swing freely about the axis of said support, a pulley shaft journalled on said carrier parallel to said axis, a pulley and a pinion mounted on said pulley shaft, said pinion meshing said spur gear, said carrier including a lubricant-tight housing enclosing said gear and pinion, said housing having an opening provided with a lubricant seal through which said pulley shaft passes, a clutch located outside said housing between said pulley and pulley shaft, said pulley shaft having means for leading lubricant from the inside of said housing to the bearing surfaces of said clutch.

2. In a power transmitting device, a rotatable support, a spur gear secured to said support, an arm suspended from said support and adapted freely to swing about said support as a center, a shaft parallel to the axis of said rotatable support, said shaft being journalled on said arm, a belt-supporting pulley on said shaft, said shaft having gear teeth cut therein providing an integral pinion, said pinion meshing with said spur gear.

3. In a belt tightening device, an attaching sleeve for attachment to a supporting shaft, a spur gear secured to said attaching sleeve, a housing having inner and outer side walls connected by a peripheral wall, said side walls having supporting bearings journalled on said attaching sleeve on both sides of said gear, a pulley shaft parallel to said sleeve, a pulley on said pulley shaft, a pinion on said pulley shaft meshing with said gear, an outboard pulley shaft bearing spaced from said inner side wall, a second pulley shaft bearing on said outer side wall, said pulley shaft being disposed in said pulley shaft bearings with said pulley between said outboard bearing and said inner side wall and with said pinion located between said inner and outer side walls, said inner side wall having a lubricant seal engaging the pulley shaft between said pulley and said pinion, and a bracing arm extending across the axis of said attaching sleeve and secured to said outboard bearing and to said housing adjacent the peripheral wall thereof and spaced from the supporting bearing, whereby said pulley may overlap said supporting shaft, said housing and said bracing arm forming a carrier freely swingable about said attaching sleeve.

4. In a power transmission device, in combination, an attaching sleeve adapted to be mounted on a shaft, a gear secured to said sleeve, a frame mounted on said sleeve for swinging movement thereabout, a gear meshing with said first gear, a pulley shaft operatively connected to said second gear, an open end pulley mounted on said pulley shaft having a first cylindrical flange journalled on said pulley shaft, a second cylindrical flange concentrically spaced from said first flange, and a third cylindrical flange concentrically spaced from said second flange and adapted to support a belt, a clutch hub fixed to said pulley shaft and having clutch members located between said first and second cylindrical flanges and engageable with said second cylindrical flange for operatively connecting said pulley to said pulley shaft.

DAVID K. PILKINGTON.